(12) United States Patent
Jacobson

(10) Patent No.: US 10,050,533 B2
(45) Date of Patent: Aug. 14, 2018

(54) HIGH VOLTAGE HIGH FREQUENCY TRANSFORMER

(71) Applicant: Raytheon Company, Waltham, MA (US)

(72) Inventor: Boris S. Jacobson, Westford, MA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/219,674

(22) Filed: Jul. 26, 2016

(65) Prior Publication Data

US 2018/0034372 A1 Feb. 1, 2018

(51) Int. Cl.
*H02J 1/00* (2006.01)
*H02M 3/24* (2006.01)
*H02M 1/44* (2007.01)

(52) U.S. Cl.
CPC ............... *H02M 3/24* (2013.01); *H02M 1/44* (2013.01)

(58) Field of Classification Search
CPC ............ H02M 3/22; H02M 3/24; H02M 3/28; H02M 3/3155; H02M 3/325; H02M 3/335; H02M 3/33507; H02M 3/33523
USPC ...................................................... 363/15–28
See application file for complete search history.

(56) References Cited

U.S. PATENT DOCUMENTS

| | | |
|---|---|---|
| 4,942,353 A | 7/1990 | Herbert et al. |
| 4,977,301 A | 12/1990 | Maehara et al. |
| 4,978,906 A | 12/1990 | Herbert et al. |
| 5,312,674 A | 5/1994 | Haertling et al. |
| 5,745,981 A | 5/1998 | Roshen et al. |
| 5,777,539 A | 7/1998 | Folker et al. |
| 5,959,522 A | 9/1999 | Andrews |
| 5,973,923 A | 10/1999 | Jitaru |
| 5,990,776 A | 11/1999 | Jitaru |
| 5,999,078 A | 12/1999 | Herbert |
| 6,445,272 B1 | 9/2002 | Mercado et al. |
| 6,628,531 B2 | 9/2003 | Dadafshar |
| 6,727,793 B2 | 4/2004 | Piechnick |
| 6,820,321 B2 | 11/2004 | Harding |
| 6,847,284 B2 | 1/2005 | Gamou et al. |
| 7,084,728 B2 | 8/2006 | Hyvönen |
| 7,187,263 B2 | 3/2007 | Vinciarelli |
| 7,248,138 B2 | 7/2007 | Chiang et al. |
| 7,262,680 B2 | 8/2007 | Wang |
| 7,304,862 B2 | 12/2007 | Busletta et al. |

(Continued)

*Primary Examiner* — Alex Torres-Rivera
(74) *Attorney, Agent, or Firm* — Cantor Colburn LLP

(57) ABSTRACT

A transformer includes: a core having a central arm and first and second outer arms on opposite sides of the of the central arm; a primary winding surrounding the central arm; a secondary winding surrounding the central arm; a primary winding shield surrounding the primary winding including a center tap connection connected to an output power connection; and a secondary winding shield surrounding the secondary winding including a center tap connection connected to an output power connection is disclosed. The transformer also includes a DC-to-AC converter connected to the primary winding that includes a primary bias power supply, a primary conversion element and a primary controller, an AC-to-DC converter connected to the secondary winding, a sensor connected to an output of the AC-to-DC converter and a secondary bias power supply that receives power from the secondary winding shield.

14 Claims, 8 Drawing Sheets

(56) References Cited

U.S. PATENT DOCUMENTS

| | | | |
|---|---|---|---|
| 7,361,847 B2 | 4/2008 | Dunn et al. | |
| 7,382,219 B1 | 6/2008 | Lee | |
| 7,477,120 B2* | 1/2009 | Gu | H01F 27/367 336/84 C |
| 8,089,331 B2 | 1/2012 | Jacobson et al. | |
| 2002/0006045 A1* | 1/2002 | Shirai | H02M 1/32 363/17 |
| 2004/0196668 A1* | 10/2004 | Park | H01F 27/367 363/16 |
| 2007/0171585 A1* | 7/2007 | Sicong | H01F 27/362 361/38 |
| 2011/0103104 A1* | 5/2011 | Zhan | H02M 3/33507 363/21.17 |
| 2013/0242452 A1* | 9/2013 | Park | H01F 27/33 361/143 |
| 2014/0139313 A1* | 5/2014 | Zhou | B65H 75/14 336/84 C |
| 2014/0185337 A1* | 7/2014 | Espino | H01F 27/362 363/21.17 |

\* cited by examiner

HIGH VOLTAGE HIGH FREQUENCY TRANSFORMER

BACKGROUND

The present invention relates to providing power and, more specifically, to providing a compact, high-voltage, high-frequency transformer to provide power.

Power converters are used to convert power from an input to a needed power for provision to a load. One type of power converter is a transformer. Transformers may be designed to convert a fixed AC input voltage into a higher or lower AC voltage. The architecture chosen may provide for high frequency operation, pulse-width-modulation, isolation, and the like.

Different types of transformers may be used depending on a particular application. A typical power transformer includes one or more input windings and one or more output windings. The input and output windings are both wrapped around a core formed of a magnetic material. An alternating current provided at the input (e.g., primary) windings causes a varying magnetic flux in the transformer core. This flux leads to a time varying magnetic field that includes a voltage in the output (e.g., secondary) windings of the transformer.

In some cases, the core is so-called "closed-core." An example of closed-core is a "shell form" core. In a shell form, the primary and secondary windings are both wrapped around a central core arm and a both surrounded by outer arms. In some cases, more than one primary winding is provided and multiple secondary windings may also be provided. In such systems, based on the input and to which of the primary windings that input is provided (of course, power could also be provided to more than one primary winding in some instances) different output voltages can be created at each of the secondary windings.

Some power transformers operate at high voltages and/or currents. Such power transformers may produce strong electromagnetic (EM) fields. One approach to deal with the electric fields and parasitic currents they produce is to shield one or both of the primary and secondary windings. This may be especially important where the power transformer operates in high, very-high or ultra-high frequency bands. An example is a power transformer used in a microwave power module.

In some applications, the cost of high frequency and/or high voltage transformers for use in compact equipment can be high relative to the cost of the equipment as a whole or compared to other elements in the equipment. Further, in some cases, the transformer can be difficult to make or prone to failures.

SUMMARY

According to one embodiment a transformer that includes: a core having a central arm and first and second outer arms on opposite sides of the of the central arm; a primary winding surrounding the central arm; a secondary winding surrounding the central arm; a primary winding shield surrounding the primary winding including a center tap connection connected to an output power connection; and a secondary winding shield surrounding the secondary winding including a center tap connection connected to an output power connection is disclosed. The transformer also includes a DC-to-AC converter connected to the primary winding that includes a primary bias power supply, a primary conversion element and a primary controller, an AC-to-DC converter connected to the secondary winding, a sensor connected to an output of the AC-to-DC converter and a secondary bias power supply. The secondary bias power supply is electrically connected to the secondary winding shield and the sensor, the secondary bias power supply, in operation, receives power from the secondary winding shield and provides power to the sensor.

According to another embodiment a method of forming a transformer, is disclosed. The method includes: providing core having a central arm and first and second outer arms on opposite sides of the of the central arm; forming a primary winding around the central arm; forming a secondary winding around the central arm; disposing the primary winding in a primary winding shield; disposing the secondary winding in a secondary winding shield; connecting a DC-to-AC converter to the primary winding, the DC-to-AC converting including a primary bias power supply, a primary conversion element and a primary controller; connecting an AC-to-DC converter to the secondary winding; connecting a sensor to an output of the AC-to-DC converter; and connecting a secondary bias power supply to the secondary winding shield and the sensor, the secondary bias power supply such that, in operation, the secondary bias power supply receives power from the secondary winding shield and provides power to the sensor.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As will be described below, a multiple primary and second winding transformer is disclosed. The windings may be printed on one or more printed circuit boards (PCBs) and the primary windings are shielded from the secondary windings by surrounding one or both in an outer case that includes a substantially smooth shaped shield disposed therein. Further, current or voltage sensors on the secondary side may require additional power. Such additional power may be sourced from the shield surrounding the secondary winding. In other embodiments, the power sourced from the shield may be used for other power needs such as providing more power to the primary load. In yet another embodiment, the primary current input may be regulated and connected to the shields surrounding the primary windings to provide an alternative and more efficient manner of providing power to the control mechanism of the primary.

Figure 1:
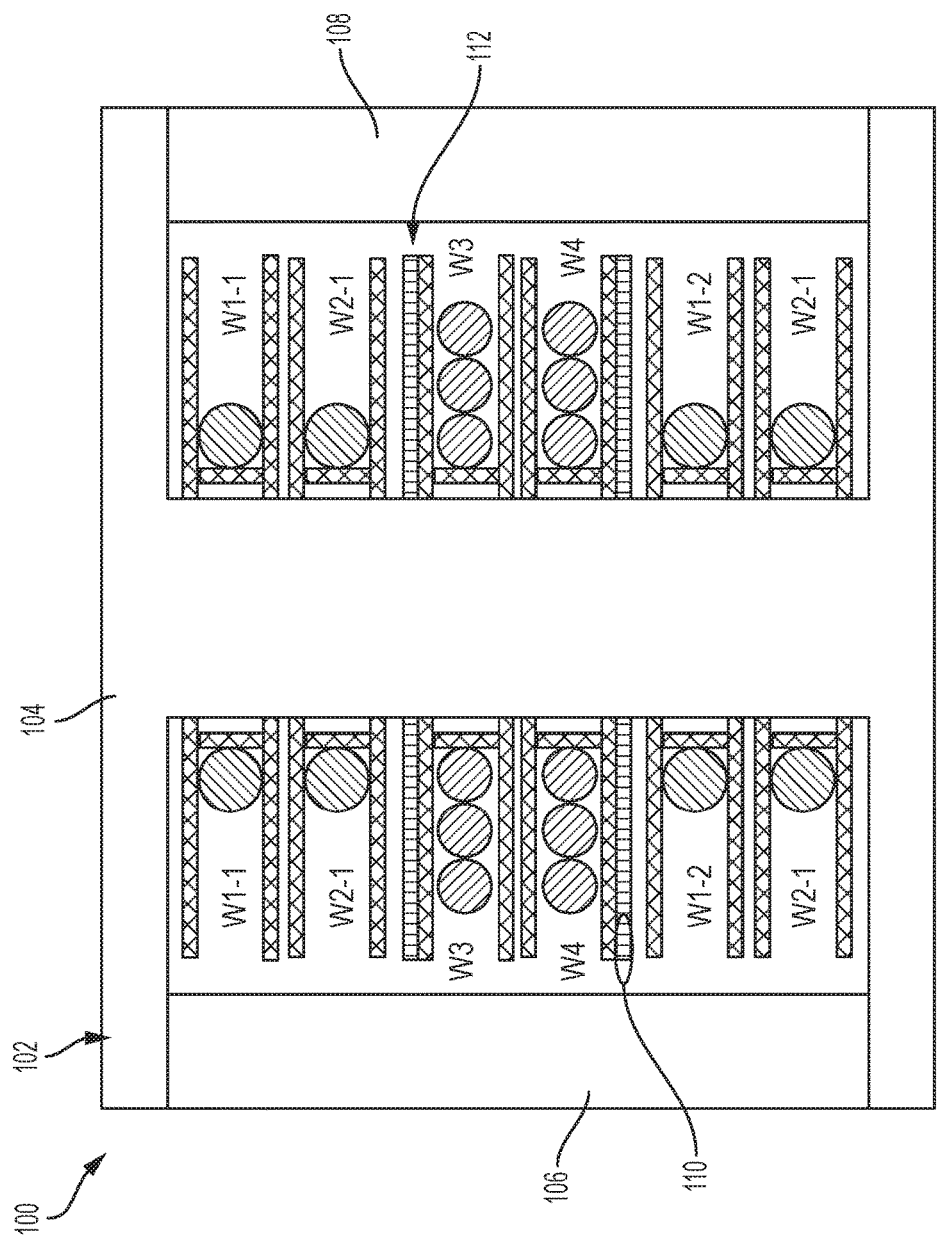
FIG. 1 shows a cross section of a transformer with multiple primary and multiple secondary windings and a shell form core.

FIG. 1 shows an example of a prior art transformer. As illustrated, the transformer 100 includes a core 102. The core 102 may be formed in the prior art and in embodiments disclosed herein by a metal or other magnetically conductive material. Examples includes include ferromagnetic metal such as iron, or ferromagnetic compounds such as ferrites. Other examples include laminated silicon steel. The teachings herein are applied to a core 102 that is of the closed variety and in particular to a shell core having a central arm 104 and outer arms 106, 108.

As illustrated, the transformer 100 includes four primary windings, each having a single turn and are labelled as a first primary winding W1-1, a second primary winding W2-1, a third primary winding W1-2 and a fourth primary winding W2-1. In this and other examples, the primary windings are part of the so-called "low voltage" side of the transformer and each include 1 turn. The illustrated transformer includes two secondary windings W3 and W4 both formed of three turns. In this and other examples, the secondary windings are part of the so-called "high voltage" side of the transformer and each include 3 turns. A low voltage provided to the one or more of the primary winding creates a higher voltage in the secondary windings. Of course, if the number of turns one the primary and secondary could be changes and, accordingly the naming secondary would be low voltage side.

In the example shown in FIG. 1, the primary windings are shielded from the secondary windings W3, W4 by shields 110 and 112. The shields 110, 112 can be an electrostatic shield formed of a conductive metal such a copper. The shields 110, 112 may minimize conducted (coupled through parasitic capacitance) and radiated emissions from secondary-winding high-voltage spikes being transmitted to the primary windings or vice-versa. In some cases, the shield is placed between a transformer's primary and secondary windings to reduce EMI and usually consists of one turn of thin copper foil around the secondary windings. The shield 110 may be coupled to a circuit or system ground that is attached to prevent high-frequency current from coupling.

It has been discovered that sharp edges in a high voltage (HV) region (e.g., near the secondary windings W3, W4) provide locations where partial discharges (coronas) may form. However, foil-based shields and windings made with small diameter wire (in the range of several mils) may create such edges leading to a high-intensity electric field that forms such partial discharges.

Figure 2:
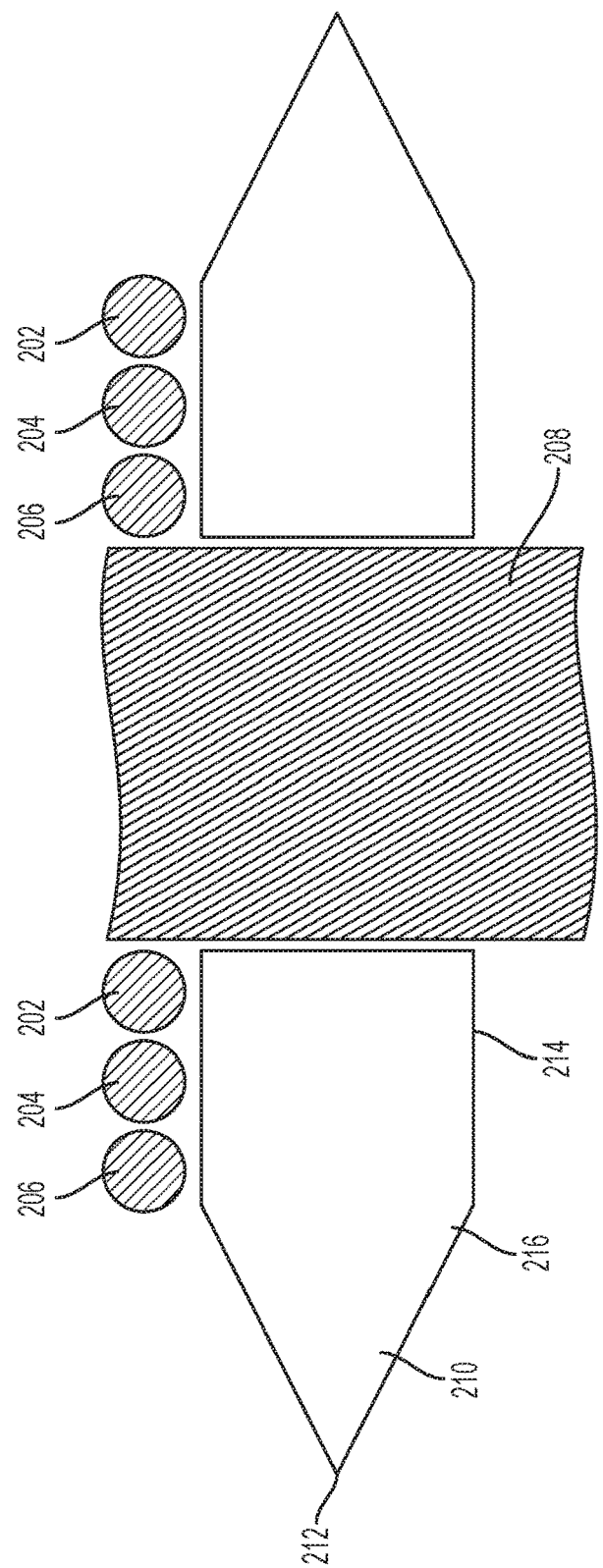
FIG. 2 shows a close up cut-away side view of three windings surrounding a core arm.

For example, FIG. 2 shows a partial cross section of an example shield 210 disposed below three winding turns 202, 204, 206. The windings are wrapped around an arm 208 (e.g., a central arm) of a core. These winding turns 202-206 are shown as being formed of cylindrical wire and are by way of example only. In FIG. 2, an outer edge 212 of the foil shield 210 is one place where discharge may occur while the fields are much lower in smooth regions such a regions 214 and 216. In short, locations where a foil or other shield 210 form a sharp edge can lead to less than desirable results. One approach is to, therefore, not include the shield. However, this may result in the increased interwinding capacitance described above, increased parasitic primary-to-secondary currents and degraded safety. The shield is not the only source of corona because windings made out of fine wire also produce a large electric field gradient.

In some cases high-voltage, high-frequency transformers often use flat, "pancake" windings to reduce the transformer primary-to-secondary equivalent capacitance. This could lead to a solution where a shield may not be needed. These windings, however, can be labor intensive to use.

Another approach to reduce transformer cost is to form planar windings on a printed circuit board (PCB). However, such windings are not used because winding traces may have sharp edges that further increase electric field intensity issues that are present in foil shields described above.

Figure 3A:
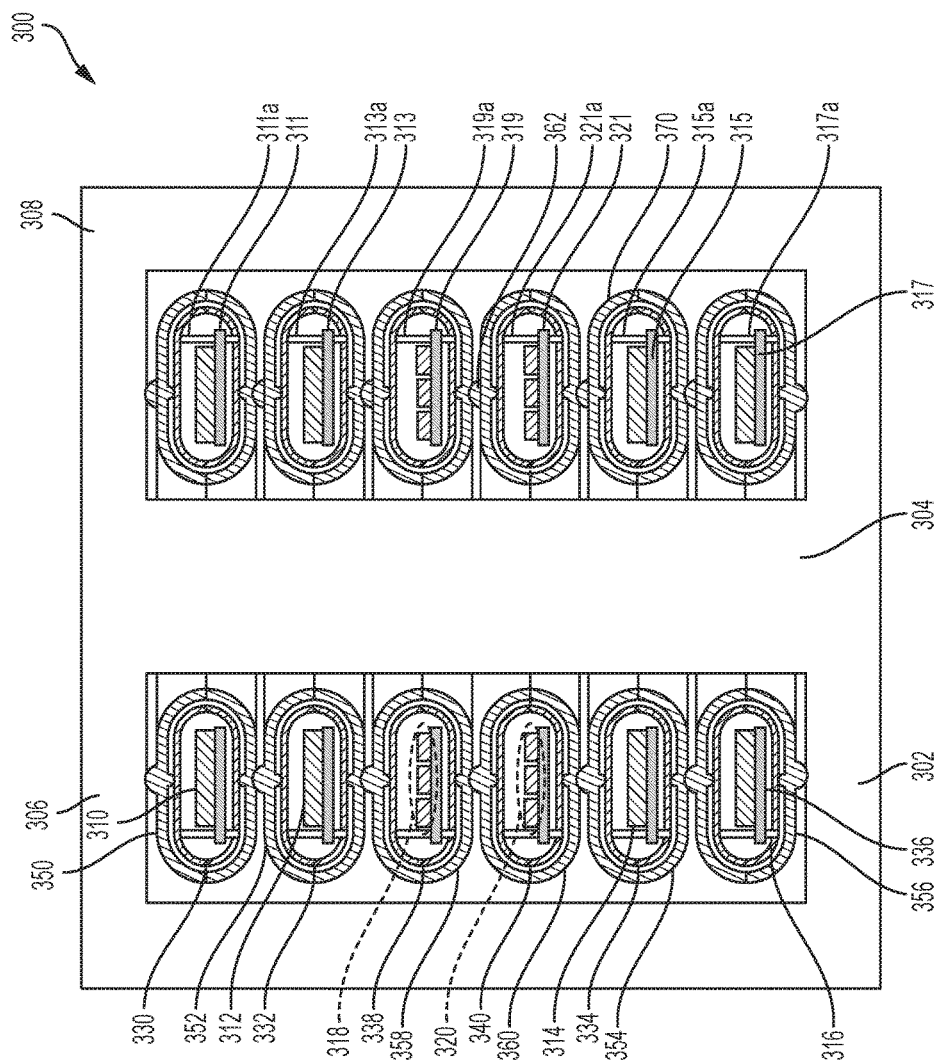
FIGS. 3A, 3B and 3C show, respectively, a cut-away side view of a transformer with six shielded and insulated sections according to one embodiment formed with square-edged winding traces, a circuit diagram of the transformer of FIG. 3A and a cut-away side view of a transformer with three shielded and insulated sections.

FIG. 3A shows a side view of an example of transformer 300 according to one embodiment. While specific turns ratios and interleaving of primary and secondary windings is shown in FIG. 3A it shall be understood that the teachings herein can be applied to any implementation of a transformer regardless of turns ratios or the exact orientation of the primary and secondary windings. Further, the windings can be printed on a PCB in one embodiment.

The transformer 300 includes a core 302. The core 302, as described above, may be formed a metal or other magnetically conductive material. Examples includes include ferromagnetic metal such as iron, or ferromagnetic compounds such as ferrites. Other examples include laminated silicon steel. The illustrated core 302 is of the closed variety, and in particular to a shell core, having a central arm 304 and outer arms 306, 308.

As illustrated, the transformer includes a first pair of primary windings 310, 312 and a second pair of primary windings 314, 316. Each of these windings are illustrated as being formed of a single turn. Of course, the number of and turns of each primary windings may be limited varied as long as one primary winding is provided that has at least one turn. In embodiments herein, one or more of the primary windings 310, 312, 314, 316 are planar windings formed on and supported by a substrate. As illustrated, each winding 310, 312, 314, 316 is formed on and supported by a substrate labeled as 311, 313, 315, 317 formed of a dielectric material.

The transformer 300 also includes secondary windings 318, 320. Each of these windings is illustrated as being formed of three turns. Of course, the number of and turns of each secondary winding 318, 320 may be limited varied as long as one secondary winding is provided that has at least one turn. In embodiments herein, one or more of the secondary windings 318, 320 are planar windings formed on and supported by a substrate. As illustrated, each winding 318, 320 is formed on and supported by a substrate labeled as 319, 321 formed of a dielectric material.

In this manner, one or more of the primary and secondary windings may be formed as part of a printed circuit board. In the prior art using such windings was typically avoided as the traces forming the windings have sharp edges that further increase electric field intensity at those locations and can lead the same or similar problems discussed above with respect to sharp shield edges.

To overcome one or more of the possible problems described above, one or more toroid-shaped shields are provided. As illustrated, each winding 310, 312, 314, 316, 318, 320 is surrounded by a toroid shaped shield. In particular, windings 310, 312, 314, 316, 318, 320 are surrounded by shields 330, 332, 334, 336, 338, 340, respectively. That is, in this embodiment, each winding includes its own shield. In an alternative embodiment, and as shown in FIG. 3C, each pair of primary windings 310, 312 and 314, 316 is within a single primary shield 380, 382, respectively and both secondary windings 318, 320 are within a single secondary shield 384.

Each of the substrates 311, 313, 315, 317, 319 and 321 may be supported within their respective shields by a respective support member 311a-321a. The support member may be formed of a dielectric or other not conductive material in one embodiment. The support members can be formed at part of the substrate and sided and arranged such that contact a top and bottom surface of the shields to provide a rigid support from which its respective substrate may extend.

In one embodiment, each shield 330, 332, 334, 336, 338, 340 is surrounded by a respective insulting tube 350, 352, 354, 356, 358, 360 (as shown, the tubes are in the form of a hollow toroid). The tube may be formed of any non-conductive material. One or more of the insulating tube 350, 352, 354, 356, 358, 360 may include an optional offset member 362 that provides a means to slightly separate the insulating tubes from one another.

According to one embodiment, one or more of the shields 330, 332, 334, 336, 338, 340 may be shaped such that a portion that is not flat is arcuate. That is, one embodiment, one or more of the shields may be shaped such that, in cross section, they do not have any sharp edges, corners, or discontinuous surfaces. However, U.S. patent application Ser. No. 14/935,608, filed 9 Nov. 2015, entitled HIGH VOLTAGE HIGH FREQUENCY TRANSFORMER, one or more cuts may be made to the shields but these, while they may introduce a discontinuity at the location of the cut, the cut does not change the shape of the cross-section of the shield. The shields function to change the contour of the HV electric field (e.g., emerging from the flat windings) to reduce its intensity and eliminate ionization.

Figure 3B:
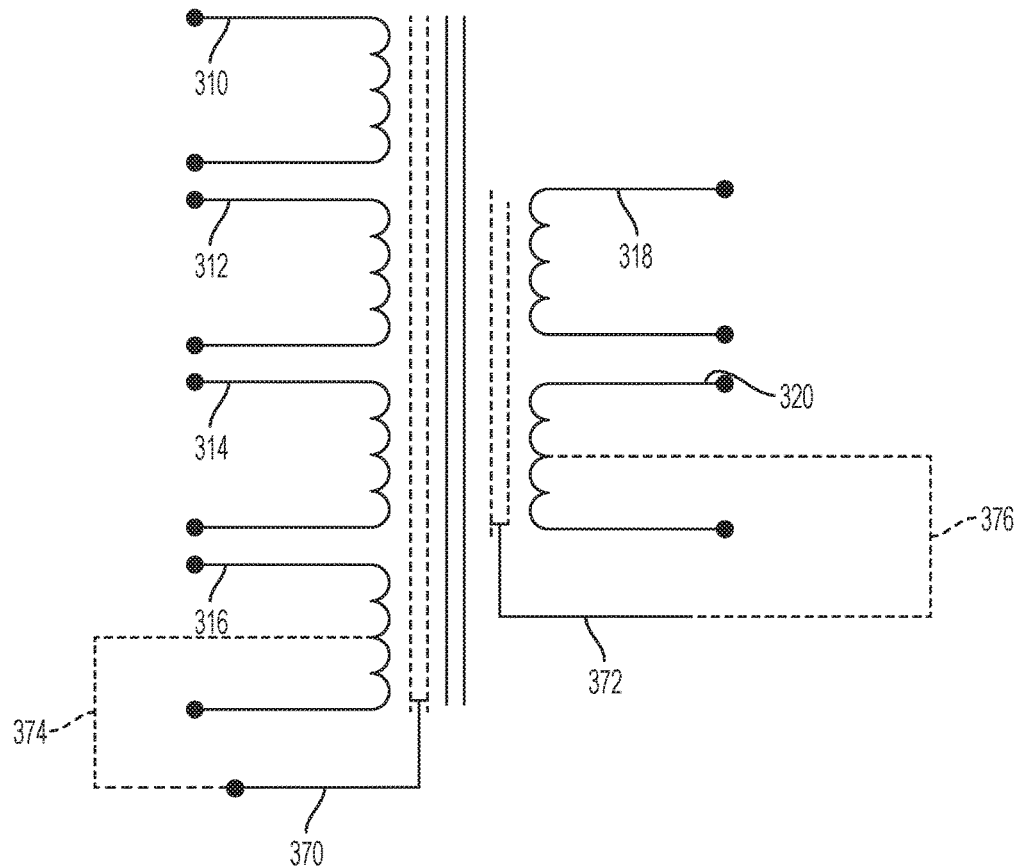
Figure 3C:
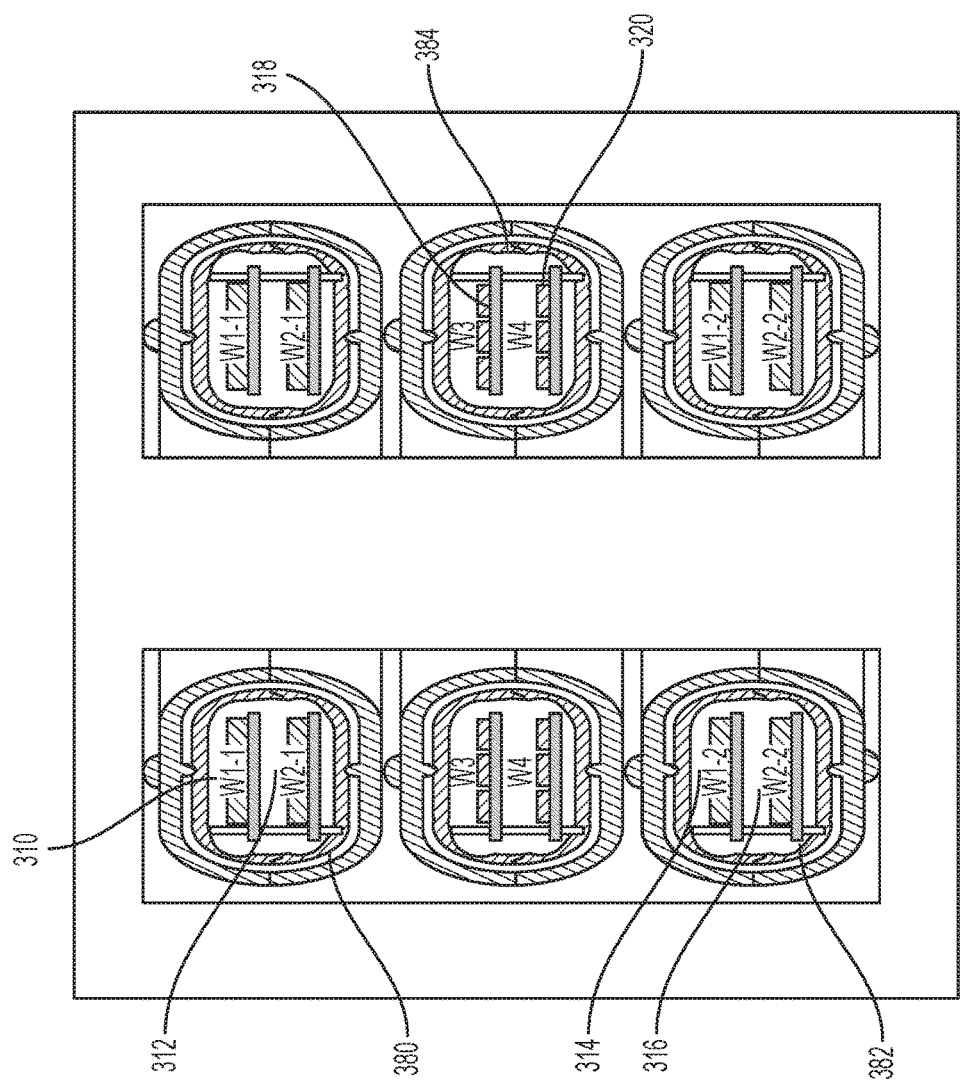

FIG. 3B shows a circuit diagram of the transformer shown in FIG. 3A. In this depiction, the shields are divided into primary and secondary shields 370, 372. In one embodiment, the primary shield 370 in actually the electrical equivalent of shields 330, 332, 334, 336 and the secondary shield 372 is the electrical equivalent of shields 338 and 340. The primary shield 352 is connected to a steady potential at the primary side and the secondary shield is connected to a potential on the secondary side. Examples of a steady potential include a center tap of the transformer winding (see optional connections 374, 376), a neutral point (if a three-phase transformer with star connection of windings is used) or any DC potential available in the power converter using this transformer. In one embodiment, the DC voltages help maintain a minimum voltage difference between the shields and the enclosed windings. Further information related to how to form the system shown in FIGS. 3A-3C may be found in U.S. patent application Ser. No. 14/935,608, filed 9 Nov. 2015, entitled HIGH VOLTAGE HIGH FREQUENCY TRANSFORMER which is hereby incorporated by reference in its entirety herein.

Figure 4:
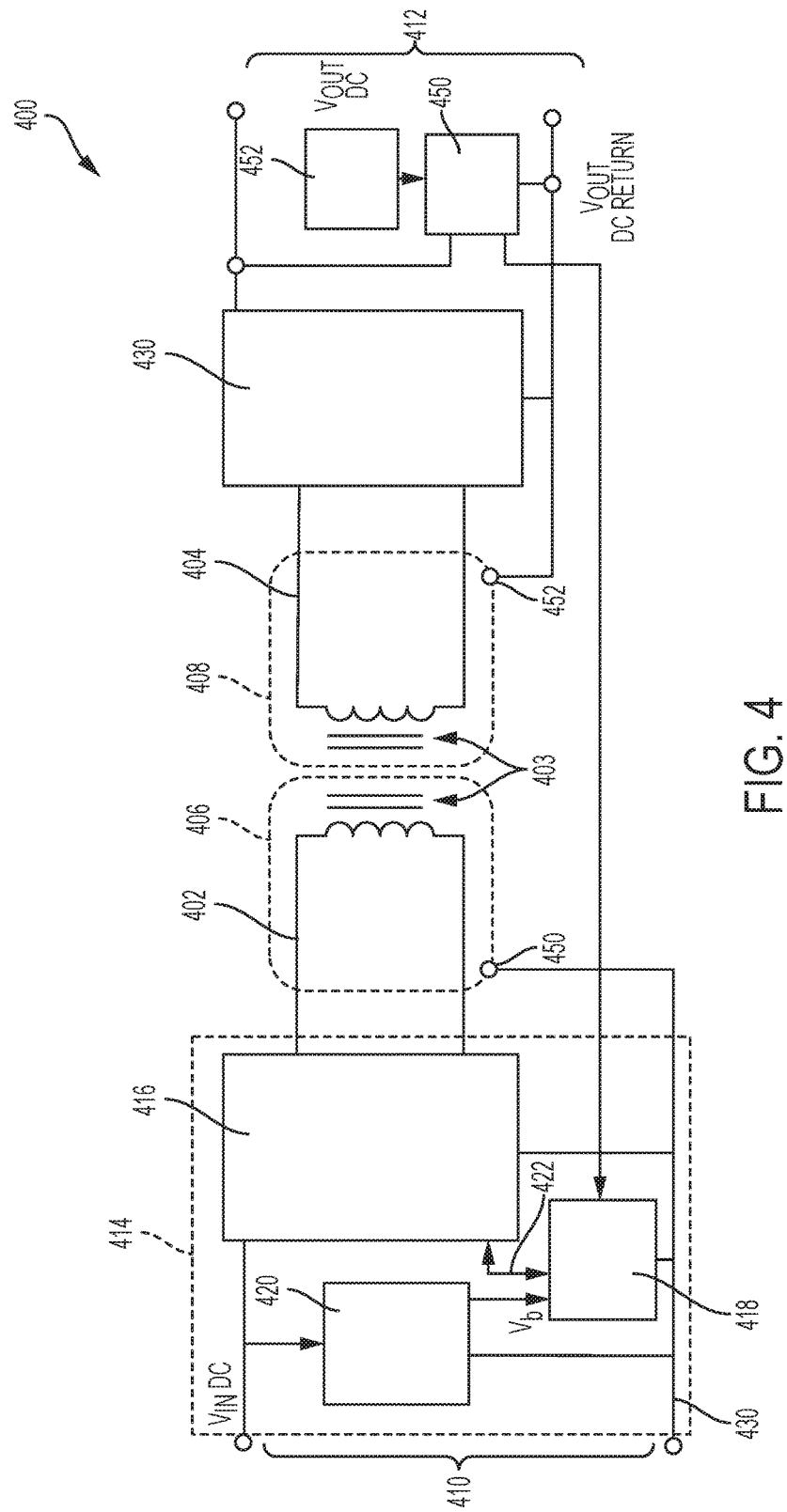
FIG. 4 shows a block diagram of system where the secondary bias power supply is not connected to a power source.

As briefly discussed above, embodiments disclosed herein may utilize the shields on one or both of the primary and secondary side to power elements used to control operation of the transformer. Examples of such devices include an auxiliary (or bias) power supply used to provide power to an output sensor that may sense an electrical property such as current or voltage. FIG. 4 shows a simplified circuit diagram of the system 400 to explain a problem solved by one or more embodiments disclosed herein in a system including the shields as described above.

The system 400 in FIG. 4 includes a primary winding 402 and a secondary winding 404. Each of the windings 402, 404 is surrounded by a shield 406, 408 respectively. Shields 406 and 408 may be referred to as input and output shields. The shield may be toroidal in shape and includes opposing flat surfaces connected by arcuate inner connectors. Of course, the exact shape could be varied. To avoid shorting the transformer, the shields 406, 408 may have a single cut formed therein. This is due to the fact that if a shield forms a continuous loop around the center leg of the core 403, it will act as a shorted turn of the winding and, in effect, short circuit the transformer.

In operation, a DC input 410 is converted to a DC output 412 that is at a different voltage level than input 410, the level of which depends, in part, on the turns ratio between the primary 402 and secondary 404, windings. In order to convert the DC input 410 in to a form (e.g., AC) that allows for level conversion between the primary and secondary windings 402, 404, a DC-to-AC converter 414 is provided. The DC-to-AC converter 414 may also be referred to as in inverter. The converter 414 is generally shown as including a primary power conversion element 416, a primary controller 418 and a primary bias power supply 420 that provides power to the controller 418. As the type of inverter is not limited herein, a detailed explanation is not provided. However, generally, the power conversion element 416 includes one or more switching elements connected to the primary winding 402. The controller 418 is used to control when the one or more switches are opened/closed. That controller 418 is often operating at different (e.g., lower) power/voltage than is provided at the DC input 410 and, thus, the bias power supply 420 converts the voltage provided at the DC input 410 to a lower value (shown as $V_b$ in FIG. 4) to power the controller 418. The controller 418 provides control signals as indicated by connection 422 to the conversion element 416. As illustrated, portions of the inverter 412 and the primary shield 406 are connected to and input return line 430.

Similar to the primary winding 402, the secondary winding 404 is surrounded by a shield 408 and is connected to secondary power converter that, in this case, is an AC-to-DC converter 430. To keep the output voltage 412 VoutDC at a desired level, a sensor 450 may be provided that measures a current/voltage across the output. Thus, sensor 450 may be one or both of a current or voltage sensor or may measure other electrical parameters such as power.

The sensor 450 may be powered by a so called "bias power supply" that is shown as secondary bias power supply 452 in FIG. 4 and provide its readings to the primary controller 418. This may allow the controller 418 to adjust or otherwise control the operation of the inverter 416 such that desired output voltage VoutDC (at output 412) is presented. However, as illustrated, there is not a power source provided to the secondary bias power supply 452. One approach would be provide a dedicated secondary bias power supply with high voltage isolation capability fed from an input source but such may be expensive, heavy and large. Another option is to provide an extra winding about the core 403 (e.g., an additional shielded winding built into the power transformer) but this may make the system 400 at least one of: larger, more expensive and less reliable. As illustrated, both the primary and secondary shields 406, 408 of FIG. 4 (and subsequent shields) are connected by a center-tap (CT) (which is a midpoint of the shield equally distant from its ends) is connected to a steady potential on the same side of the transformer as the shield itself. In other words, the primary shield's CT 450 is be connected to the primary DC return 430 and the secondary shield's CT 452 is connected to VoutDC return. Of course, the shields could be connected to the opposite (e.g., non-return) DC power location as well.

Figure 5:
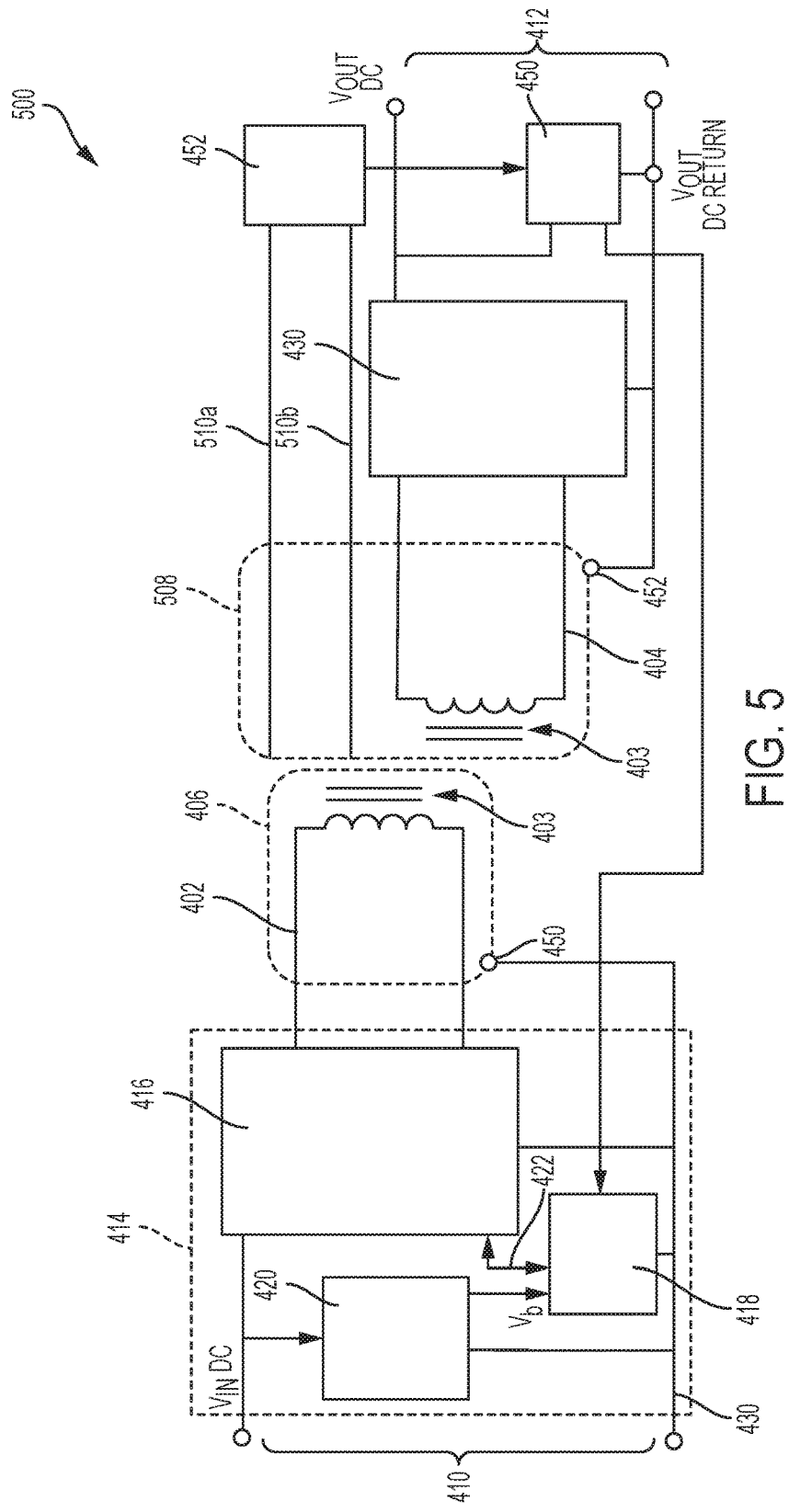
FIG. 5 shows a block diagram of a system where the secondary bias power supply receives power from a secondary shield surrounding a secondary winding.

The system 500 in FIG. 5 operates similar to that in FIG. 4 but in this system 500 the secondary bias power supply 452 receives power from the secondary shield 508 via connections 510a and 510b. All other operation is generally similar. In that regard, system 500 includes a primary winding 402 and a secondary winding 404. Each of the windings 402, 404 are surrounded by a shield 406, 508 respectively. The shield may be toroidal in shape and includes opposing flat surfaces connected by arcuate inner connectors. Of course, the exact shape could be varied. To avoid shorting the transformer, the shields 406, 508 may have a single cut formed therein. This is due to the fact that if a shield forms a continuous loop around the center leg of the core 403, it will act as a shorted turn of the winding and, in effect, short circuit the transformer.

In operation, a DC input 410 is converted to a DC output 412 that is at a different voltage level than input 410, the level of which depends, in part, on the turns ratio between the primary 402, 404, windings. In order to convert the DC input 410 in to a form (e.g., AC) that allows for level conversion between the primary and secondary windings 402, 404, a DC-to-AC converter 414 is provided and is generally shown as including a power conversion element 416, a controller 418 and a primary bias power supply 420 that provides power to the controller 418. That controller 418 is typically operating at different (e.g., lower) power/voltage than is provided at the DC input 410 and, thus, the primary bias power supply 420 converts the voltage provided at the DC input 410 to a lower value (shown as $V_b$ in FIG. 5) to power the controller 418. The controller 418 provides control signals as indicated by connection 422 to the conversion element 416. As illustrated, portions of the inverter 412 and the primary shield 406 are connected to input return line.

Similar to the primary winding 402, the secondary winding 404 is surrounded by a shield 508 and is connected to secondary power converter that, in this case, is an AC-to-DC converter 430. To keep the output voltage 412 (VoutDC) at a desired level, a sensor 450 may be provided that measures a current/voltage across the output. Such a device may be powered by secondary bias power supply 452 in FIG. 4 and provide its readings to the controller 418. This may allow the controller 418 to adjust or otherwise control the operation of the inverter 416 such that desired output voltage VoutDC is presented. However, as illustrated, the secondary bias power supply 452 receives power from the shield via power connection lines 510a and 510b. In this manner, the shield 508 is operating as another winding of the transformer while still reducing the probability of a corona inception and/or reducing primary to secondary capacitive currents.

Figure 6:
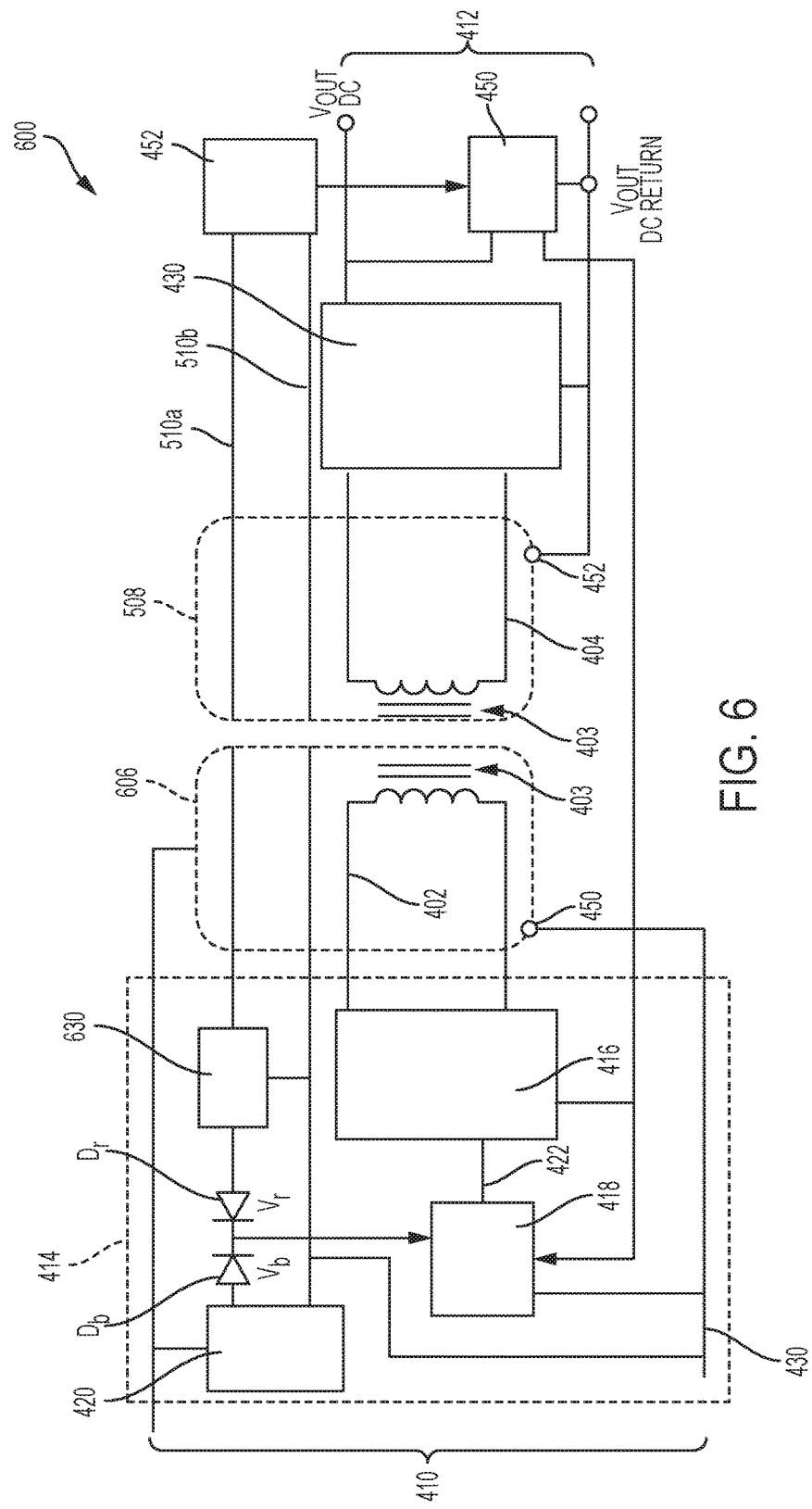
FIG. 6 shows a block diagram of a system where the primary bias power supply receives power from the input power in a first operational mode and receives power from a primary shield surrounding a primary winding surrounding a primary winding in a second operational mode and the secondary bias power supply receives power from a secondary shield surrounding a secondary winding.

The system 600 in FIG. 6 operates similar to that in FIG. 5 but in this system 600 the primary bias power supply 420 provides power to the controller 418 in a first operational mode (the startup timing described below) and then a voltage regulator 630 provides that power in a second operational mode (after Vr is greater than $V_v$). In this embodiment, the primary shield 606 provides a low current source that provides power to the controller 418 in the second operational mode. This may be advantageous in situations where the primary bias power supply 420 is a linear regulator. For example, if the DC input 410 is 1000V and the primary bias power supply is converting to a 12V output at 200 mA, the power supply is dissipating nearly 200 W of power.

In this embodiment, a DC input 410 is converted to a DC output 412 that is at a different voltage level than input 410, the level of which depends, in part, on the turns ratio between the primary 402 and secondary 404, windings. In order to convert the DC input 410 in to a form (e.g., AC) that allows for level conversion between the primary and secondary windings 402, 404, a DC-to-AC converter 414 is provided. The converter 414 is generally shown as including a power conversion element 416, a controller 418 and a bias power supply 420 that provides power to the controller as in the above embodiments. In this embodiment, the converter 414 further includes a voltage regulator 630 having inputs connect to the primary shield 606 such that it may receive power therefrom. That is, power is provided to the voltage regulator 630 from the shield 616 and output at a level shown as Vr. In short, like the secondary shields described above, the primary shield 606 may be used to power the primary side controller 418 (via voltage regulator 630) and allow the primary bias power supply 420 to cease providing power.

In operation, the primary bias power supply 420 powers up the controller 418 with bias voltage $V_b$. This powering up may be referred to a first operational mode herein from time to time. This causes the converter 414 to begin to present a voltage on the primary winding 402, and consequently, a voltage will also appear on the secondary winding 404. This voltage also causes a voltage to appear on the shields 606, 508. The primary shield 606 is thus, behaving as a winding and starts feeding voltage regulator 630 that generates voltage $V_r$. The voltage regulator 630 may be sized such that it eventually provides a regulator voltage $V_r$ that exceeds the bias power supply voltage $V_b$ and, thus, causing applying reverse-bias to the bias diode $D_B$. When this happens, the regulator diode Dr becomes forward biased and the voltage regulator 630 feeds controller 418 while the primary bias power supply 420 stops feeding the controller 420. This may be referred to herein as the second operation mode and may result in reduced power dissipation.

As shown, the power supply 420 includes bias diode Db connected to its output and regulator 630 includes regulator diode Dr connected to its output. The cathodes of those two diodes are connected to one another (either directly or indirectly).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts and equivalents of all means or step plus function elements in the claims below are intended to include any structure, material or act for performing the function in combination with other claimed elements as claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A transformer comprising:
a core having a central arm and first and second outer arms on opposite sides of the central arm;
a primary winding surrounding the central arm;
a secondary winding surrounding the central arm; a primary winding shield surrounding the primary winding including a center tap connection connected to an output power connection;
a secondary winding shield surrounding the secondary winding including a second center tap connection connected to a second output power connection;
a DC-to-AC converter connected to the primary winding that includes a primary bias power supply, a primary conversion element and a primary controller;
an AC-to-DC converter connected to the secondary winding;
a sensor connected to an output of the AC-to-DC converter;
a secondary bias power supply, wherein the secondary bias power supply is electrically connected to the secondary winding shield and the sensor, the secondary bias power supply, in operation, receives power from the secondary winding shield and provides power to the sensor; and
a voltage regulator connected to the primary winding shield;
wherein the primary bias power supply provides power to the primary controller in a first operational mode and the voltage regulator provides power to the controller in a second operational mode;
a bias diode connected between an output of the primary bias power supply and the controller; and
a regulator diode connected between an output of the voltage regulator and the controller;
wherein the transformer operates in the first operational mode when an output voltage of the primary bias power supply exceeds an output voltage of the voltage regulator.

2. The transformer of claim 1, wherein the sensor is a voltage sensor.

3. The transformer of claim 2, wherein the sensor is connected to the primary controller.

4. The transformer of claim 1, wherein the transformer operates in the second operational mode when the output voltage of the voltage regulator is such that the bias diode is reverse biased.

5. The transformer of claim 4, wherein the primary bias power supply is a linear regulator.

6. The transformer of claim 4, wherein the sensor is a voltage sensor and is connected to the primary controller.

7. A method of forming a transformer, the method comprising: providing core having a central arm and first and second outer arms on opposite sides of the central arm;
forming a primary winding around the central arm;
forming a secondary winding around the central arm;
disposing the primary winding in a primary winding shield;
disposing the secondary winding in a secondary winding shield;
connecting a DC-to-AC converter to the primary winding, the DC-to-AC converting including a primary bias power supply, a primary conversion element and a primary controller;
connecting an AC-to-DC converter to the secondary winding;
connecting a sensor to an output of the AC-to-DC converter;
connecting a secondary bias power supply to the secondary winding shield and the sensor such that the secondary bias power supply, in operation, receives power from the secondary winding shield and provides power to the sensor;
connecting a voltage regulator to the primary winding shield such that the primary bias power supply provides power to the primary controller in a first operational mode and the voltage regulator provides power the controller in a second operational mode,
wherein connecting the voltage regulator includes connecting a regulator diode between an output of the voltage regulator and the controller; and
connecting a primary bias diode between an output of the primary bias power supply and the controller;
wherein the transformer operates in the first operational mode when an output voltage of the primary bias power supply exceeds an output voltage of the voltage regulator and the transformer operates in the second operational mode when the output voltage of the voltage regulator is such that the primary bias diode is reverse biased.

8. The method of claim 7, wherein the sensor is a voltage sensor.

9. The method of claim 8, wherein sensor is connected to the primary controller.

10. The method of claim 7, wherein primary bias power supply is a linear regulator.

11. The method of claim 7, further including connecting a second center tap connection of the secondary winding shield to a second output power connection.

12. The method of claim 11, further including connecting a first center tap connection of the primary winding shield to a first input power connection.

13. A method of operating a transformer, the transformer including a primary winding surrounded by a primary winding shield and connected to a DC-to-AC converter including a controller and a primary bias power supply and a voltage regulator connected to the primary shield, the method comprising:
providing power to the controller with the primary bias power supply in a first operational mode; and
providing power to the controller with the voltage regulator in a second operation mode;
wherein a regulator diode is connected between an output of the voltage regulator and the controller and a bias diode is connected between an output of the primary bias power supply and the controller, wherein:
providing power to the controller with the primary bias power supply includes providing power to the controller with the primary bias power supply while an output voltage of the primary bias power supply exceeds an output voltage of the voltage regulator.

14. The method of claim 13, wherein providing power to the controller with the voltage regulator in a second operation mode includes providing power to the controller with the voltage regulator when an output voltage of the voltage regulator is such that the primary bias diode is reverse biased.

\* \* \* \* \*